United States Patent Office 2,861,169
Patented Nov. 18, 1958

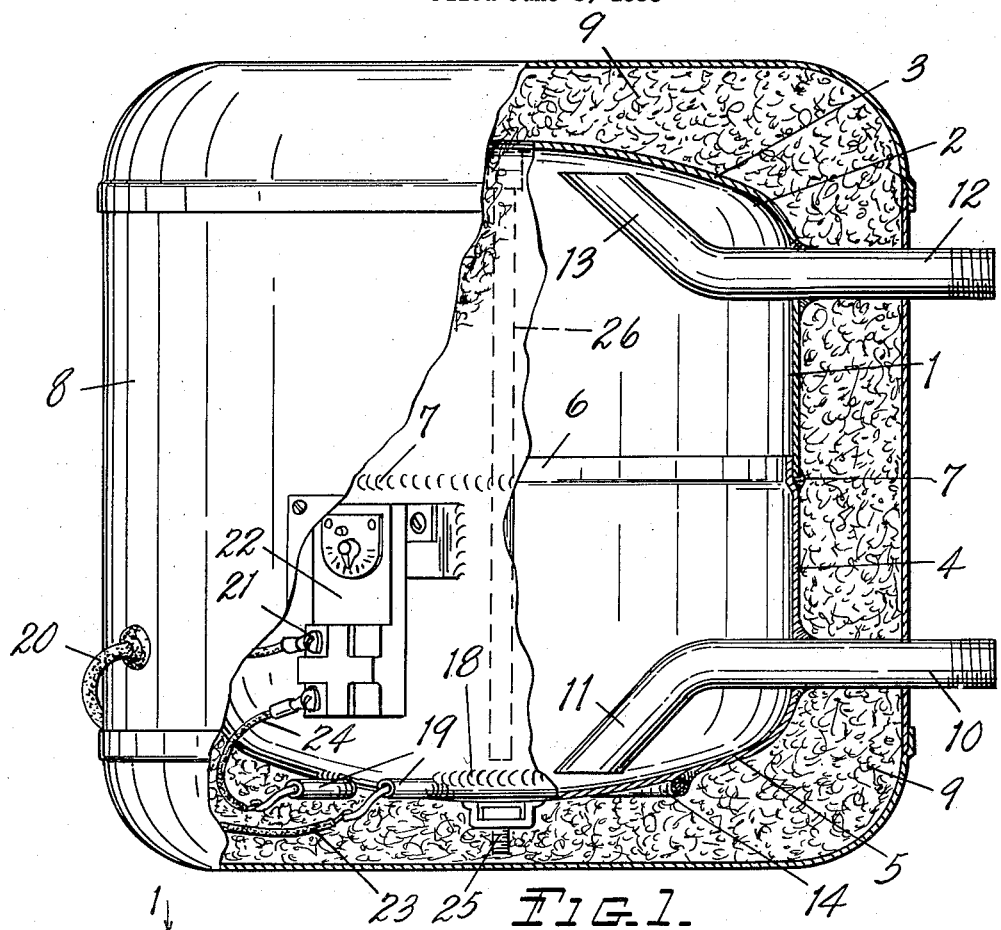
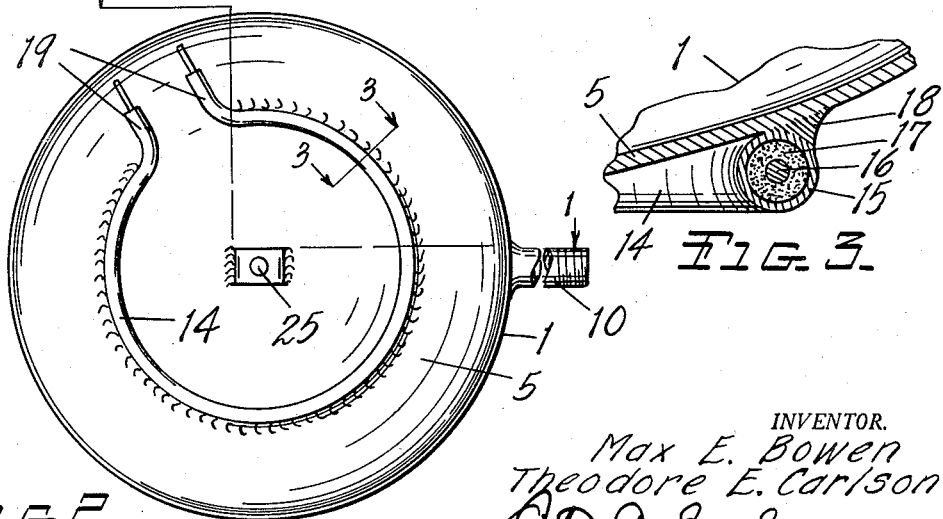
INVENTOR.
Max E. Bowen
Theodore E. Carlson

2,861,169

ELECTRIC WATER HEATER

Max E. Bowen and Theodore E. Carlson, Wixom, Mich., assignors to Handling Equipment Manufacturing Corporation, Wixom, Mich.

Application June 8, 1956, Serial No. 590,298

5 Claims. (Cl. 219—38)

This invention relates to an electric water heater.

The main objects of the invention are:

First, to provide an electric water heater which is highly efficient and has large capacity in proportion to its size.

Second, to provide a water heater in which the heating element is arranged and bonded to the closed tank so that in effect the casing of the heating element becomes a unitary part of the tank wall and is so connected as to provide for an effective heat exchange or transfer to the tank wall, utilizing the high percentage of heat units generated and to protect the heating element.

Third, to provide a water heater having these advantages which can be installed in various relations.

Objects relating to details and economies of the invention will appear from the description to follow. The invention is defined in the claims.

A structure which embodies the features of the invention is clearly illustrated in the accompanying drawing, in which:

Fig. 1 is a side elevational view of a water heater embodying the invention partially in vertical section on a line corresponding to broken line 1—1 of Fig. 2.

Fig. 2 is a bottom view of the tank with its heating element.

Fig. 3 is an enlarged fragmentary sectional view on a line corresponding to line 3—3 of Fig. 2.

The structure illustrated comprises a tank designated generally by the numeral 1 and comprising a top section 2 having a convex top wall 3 and a bottom section 4 having a convex bottom wall 5. These tank sections are of drawn sheet metal, aluminum in the preferred construction. The side wall of the bottom has an inset rim portion 6 which telescopingly receives the lower edge of the top section, the parts being fixedly connected by an electric weld or fused joint filling bond 7.

The tank is positioned within the housing 8 the walls of which are spaced from the walls of the tank to receive the insulating material 9 completely surrounding the tank. In the embodiment illustrated the tank is substantially supported by the insulating material, but is further supported by the inlet pipe 10 having a down-turned end 11 discharging against the bottom of the tank and the outlet pipe 12 having an upturned end 13 opening closely adjacent to the top wall of the tank. The inlet and outlet pipes are threaded to receive suitable couplings to supply and discharge conduits. As stated, the tank parts in the preferred embodiment are formed of aluminum, the walls being of uniform thickness.

The electric heating unit 14 comprises the tubular casing 15 desirably of cylindrical section, the resistance element 16 shown conventionally, and the insulating material 17, also shown conventionally. This heating element is disposed on the under side of the bottom in contacting relation therewith and is integrally united thereto by the fused bonding material 18 which fills in the recess defined by a substantial segment of the sheath and the tank bottom, thus providing a substantially integral connection for the heating element to the bottom and an annular transfer bond of substantial width. In the preferred embodiment the sheath and bond material are both of aluminum.

The heating element is provided with radially disposed terminals 19 which are in non-contacting relation to the bottom. The current supply connection is indicated at 20, one terminal 21 of which is connected to the thermostat 22, conventionally illustrated. The other terminal 23 is connected to one of the heating element terminals 19, the other heating element terminal 24 being connected to the thermostat. These connections form no part of the present invention. The water heater inlet discharges against the bottom within the sheath bonded zone thereof as is clearly illustrated in Fig. 1.

With this arrangement of parts a highly efficient heat transfer connection or bond is provided for the heating element to the bottom and that connection is so located that the bottom is quite uniformly heated. To facilitate this the heating element is desirably about one-half the diameter of the tank. If desired the heating bond may be substantially increased by filling the other recess defined by the bottom and the heating element with the bonding material, but it is found that bonding to the extent illustrated is sufficient, particularly with small and medium sized tanks, and it is one of the objects of this invention to provide an effective water heater which is relatively small in size and in which the water is circulated therethrough rather than stored therein.

In the embodiment illustrated the tank is provided with a projecting stud 25 by means of which a heating unit of the type shown in our copending application Serial No. 405,976, filed January 25, 1954, Patent No. 2,772,344, may be mounted. However, this is provided merely as an emergency device in the event the heating element 14 should be burned out. A protective anode 26 which may desirably be of magnesium is disposed centrally within the water tank depending from the top wall thereof.

Having thus described the invention, what is claimed as new and is desired to be secured by Letters Patent is:

1. An electric water heater comprising a cylindrical vertically disposed closed water tank having relatively thin aluminum walls and having convexedly curved top and bottom walls, and annular heating element of a diameter approximately one-half the diameter of the tank and including a tubular aluminum sheath of cylindrical section disposed upon the outer side of the bottom and in contacting engagement therewith and centered relative thereto, a fused aluminum bond filling the recess defined by adjacent annular segments of the sheath and the bottom of the heater and fixedly uniting the sheath to the bottom and providing an annular heat transfer bond of substantial width for the sheath to the bottom, the sheath having radially disposed terminals at its ends projecting from its said bonded portion and in noncontacting relation to the bottom, a water inlet conduit discharging against the bottom within the said sheath bonded zone thereof, and a water outlet conduit opening to said tank closely adjacent to the convexedly curved top wall of the tank.

2. An electric water heater comprising a cylindrical vertically disposed closed water tank having relatively thin aluminum walls and having a convexedly curved bottom wall, an annular heating element of a diameter approximately one-half the diameter of the tank and including a tubular aluminum sheath of cylindrical section disposed upon the outer side of the bottom and in contacting engagement therewith and centered relative thereto a fused aluminum bond filling the recess defined by adjacent annular segments of the sheath and the bottom of the heater and fixedly uniting the sheath to the bottom and providing an annular heat transfer bond of substantial width for the sheath to the bottoom, the sheath having terminals at its ends projecting from its said bonded portion and in noncontacting relation to the bottom.

3. An electric water heater comprising a closed water tank having an aluminum bottom, an annular heating element including a tubular aluminum sheath of cylindrical section disposed upon the outer side of and in contacting engagement with the bottom, a fused aluminum bond filling the recess defined by adjacent annular segments of the sheath and the bottom of the heater and fixedly uniting the sheath to the bottom and providing an annular heat transfer bond of substantial width for the sheath to the bottom, the sheath having radially disposed terminals at its ends projecting from its said bonded portion thereof and in non-contacting relation to the bottom, and a water inlet conduit discharging against the bottom within the said sheath bonded zone thereof.

4. An electric water heater comprising a closed water tank having an aluminum bottom, an annular heating element including a tubular aluminum sheath disposed upon the outer side of and in side contacting engagement with the bottom, and a fused aluminum bond for a substantial segment of the sheath and the bottom of the heater and fixedly uniting the sheath to the bottom and providing an annular heat transfer bond of substantial width for the sheath to the bottom.

5. An electric water heater comprising a closed water tank having a convexedly curved bottom wall of uniform thickness, an annular heating element of a diameter approximately one-half the diameter of the tank and including a tubular sheath of cylindrical section disposed upon the outer side of the bottom and in contacting enlargement therewith and centered relative thereto, a fused bond filling the recess defined by adjacent annular segments of the sheath and the bottom of the heater and fixedly uniting the sheath to the bottom and providing an annular heat transfer bond of substantial width for the sheath to the bottom, and a water inlet conduit discharging against the bottom within the said sheath bonded zone.

References Cited in the file of this patent

UNITED STATES PATENTS

| | | |
|---|---|---|
| 2,244,580 | Smith | June 3, 1941 |
| 2,422,492 | Losee | June 17, 1947 |
| 2,427,361 | Lofgren | Sept. 16, 1947 |
| 2,448,183 | Koppel | Aug. 31, 1948 |
| 2,592,568 | Hill | Apr. 15, 1952 |
| 2,597,695 | Braski et al. | May 20, 1952 |
| 2,687,469 | Koci | Aug. 24, 1954 |
| 2,694,769 | Huck et al. | Nov. 16, 1954 |
| 2,703,358 | Mertler | Mar. 1, 1955 |
| 2,744,995 | Jepson | May 8, 1956 |
| 2,753,436 | Schwaneke | July 3, 1956 |